(12) United States Patent
Kondo et al.

(10) Patent No.: US 10,960,769 B2
(45) Date of Patent: Mar. 30, 2021

(54) ONBOARD CHARGING APPARATUS

(71) Applicant: DENSO CORPORATION, Kariya (JP)

(72) Inventors: Keiji Kondo, Kariya (JP); Makoto Taniguchi, Kariya (JP); Asaka Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 124 days.

(21) Appl. No.: 15/657,871

(22) Filed: Jul. 24, 2017

(65) Prior Publication Data

US 2018/0022224 A1 Jan. 25, 2018

(30) Foreign Application Priority Data

Jul. 22, 2016 (JP) .............................. JP2016-144326

(51) Int. Cl.
| | |
|---|---|
| *B60W 20/13* | (2016.01) |
| *B60L 53/00* | (2019.01) |
| *B60L 11/18* | (2006.01) |
| *H02J 7/14* | (2006.01) |
| *B60L 53/24* | (2019.01) |
| *B60L 50/10* | (2019.01) |
| *H02J 7/00* | (2006.01) |
| *B60W 30/18* | (2012.01) |

(Continued)

(52) U.S. Cl.
CPC ........... *B60L 11/1814* (2013.01); *B60L 50/10* (2019.02); *B60L 53/24* (2019.02); *B60W 20/13* (2016.01); *H02J 7/0068* (2013.01); *H02J 7/14* (2013.01); *H02J 7/1423* (2013.01); *B60W 30/18127* (2013.01); *H02P 9/008* (2013.01); *H02P 2101/45* (2015.01); *Y02T 10/72* (2013.01); *Y10S 903/93* (2013.01)

(58) Field of Classification Search
CPC .......... H02J 7/1492; H02J 7/1469; H02J 7/34; H02J 7/345
See application file for complete search history.

(56) References Cited

U.S. PATENT DOCUMENTS 4,967,136 A * 10/1990 Nofzinger ............. H02J 7/1423
320/116
6,462,511 B1 * 10/2002 Kwok .................... H02J 7/0024
320/119

(Continued)

*Primary Examiner* — James M Dolak
(74) *Attorney, Agent, or Firm* — Oliff PLC

(57) ABSTRACT

In an onboard charging apparatus, a plurality of main electric-power storage apparatuses are connected in series to one another. A main electric-power storage apparatus on a lowest potential side of the main electric-power storage apparatuses is a lowest potential electric-power storage apparatus. The lowest potential electric-power storage apparatus has a nominal voltage that is set to 12 V, and supplies electric power to an electrical component mounted to a vehicle. In the onboard charging apparatus, a connecting unit selectively connects, by switching control, the output terminal and any of high potential side terminals of the main electric-power storage apparatuses. A switching control unit controls switching of the connecting unit to switch the high potential side terminal selected as a connection destination of the output terminal among the high potential side terminals of the main electric-power storage apparatuses, based on an output voltage of the output terminal.

18 Claims, 9 Drawing Sheets

(51) Int. Cl.
*H02P 101/45* (2016.01)
*H02P 9/00* (2006.01)

(56) References Cited

U.S. PATENT DOCUMENTS

| | | | | |
|---|---|---|---|---|
| 6,867,569 B2* | 3/2005 | Taniguchi | ............. | H02J 7/1461 |
| | | | | 322/24 |
| 6,982,499 B1* | 1/2006 | Kachi | ................ | B60L 15/2045 |
| | | | | 307/75 |
| 7,180,205 B2* | 2/2007 | Wirdel | ................... | B60L 3/003 |
| | | | | 307/10.1 |
| 7,806,796 B2* | 10/2010 | Zhu | ........................ | F16H 47/04 |
| | | | | 475/73 |
| 7,825,629 B2* | 11/2010 | Studyvin | ............... | H02J 7/0016 |
| | | | | 320/116 |
| 8,818,588 B2* | 8/2014 | Ambrosio | ................ | B60L 3/12 |
| | | | | 701/22 |
| 8,901,884 B2* | 12/2014 | Maleus | ................ | H02J 7/0014 |
| | | | | 320/116 |
| 8,917,039 B2* | 12/2014 | Yugo | ....................... | B60L 58/18 |
| | | | | 318/139 |
| 8,928,264 B2* | 1/2015 | Taniguchi | ............... | H02P 27/06 |
| | | | | 318/139 |
| 9,162,671 B2* | 10/2015 | Itoh | ....................... | B60W 10/06 |
| 9,561,790 B2* | 2/2017 | Kanehara | ............... | B60K 6/442 |
| 9,573,454 B2* | 2/2017 | Holmes | ................... | B60K 6/40 |
| 9,636,989 B2* | 5/2017 | Amemiya | ................ | B60K 6/48 |
| 9,669,717 B2* | 6/2017 | Nakata | ................ | B60W 10/184 |
| 9,694,698 B2* | 7/2017 | Ogawa | ................... | B60L 3/0084 |
| 9,707,957 B2* | 7/2017 | Shimizu | ................ | B60K 6/445 |
| 9,713,955 B2* | 7/2017 | Kanada | ................... | B60K 6/365 |
| 9,796,258 B1* | 10/2017 | Bundschuh | ........... | H02M 7/797 |
| 9,815,454 B2* | 11/2017 | Tabata | .................... | B60K 6/442 |
| 9,969,269 B2* | 5/2018 | Nomura | ................. | H02P 29/024 |
| 10,084,325 B2* | 9/2018 | Kufner | ................. | H02J 7/0024 |
| 10,461,545 B2* | 10/2019 | Inoue | ...................... | B60L 58/20 |
| 10,611,256 B2* | 4/2020 | Song | ........................ | B60L 1/14 |
| 10,784,697 B2* | 9/2020 | Koishi | ................. | B60R 16/033 |
| 2006/0110655 A1* | 5/2006 | Wirdel | .................... | B60L 3/003 |
| | | | | 429/61 |
| 2008/0164852 A1 | 7/2008 | Taniguchi | | |
| 2008/0286614 A1* | 11/2008 | Pearson | ............ | H01M 8/04679 |
| | | | | 429/431 |
| 2014/0035510 A1* | 2/2014 | Nachman | ................ | H02J 7/0018 |
| | | | | 320/101 |
| 2014/0327298 A1* | 11/2014 | Winkler | ................ | B60L 3/0046 |
| | | | | 307/9.1 |
| 2015/0094892 A1* | 4/2015 | Kanehara | ............... | B60K 6/442 |
| | | | | 701/22 |
| 2015/0175018 A1* | 6/2015 | Ogawa | ................... | B60L 3/0084 |
| | | | | 320/109 |
| 2015/0197238 A1* | 7/2015 | Itoh | ....................... | B60W 10/06 |
| | | | | 701/22 |
| 2016/0159341 A1* | 6/2016 | Tabata | ................... | B60K 6/442 |
| | | | | 701/22 |
| 2016/0167499 A1* | 6/2016 | Holmes | ................... | B60K 6/40 |
| | | | | 74/6 |
| 2016/0176298 A1* | 6/2016 | Watson | ............... | H01M 2/1072 |
| | | | | 307/10.6 |
| 2016/0193908 A1* | 7/2016 | Kanada | ................... | B60K 6/365 |
| | | | | 475/5 |
| 2016/0200200 A1* | 7/2016 | Nakata | ................ | B60W 10/184 |
| 2016/0200310 A1* | 7/2016 | Amemiya | ................ | B60K 6/48 |
| | | | | 701/22 |
| 2017/0047747 A1* | 2/2017 | Kufner | ................. | H02J 7/0024 |
| 2017/0373519 A1* | 12/2017 | Lei | ........................ | H02J 7/0054 |

* cited by examiner

WHEN SECOND ROTATING ELECTRIC MACHINE IS PROVIDED

ONBOARD CHARGING APPARATUS

CROSS-REFERENCE TO RELATED APPLICATION

This application is based on and claims the benefit of priority from Japanese Patent Application No. 2016-144326, filed Jul. 22, 2016. The entire disclosure of the above application is incorporated herein by reference.

BACKGROUND

Technical Field

The present disclosure relates to an onboard charging apparatus that is mounted to a vehicle, such as a passenger car or a commercial vehicle.

Related Art

An onboard rotating electric machine generates electric power by being rotated by motive power supplied from an engine. For example, the rotating electric machine is connected to an output shaft of the engine by a belt. In addition, the rotating electric machine is driven at an increased speed relative to a rotational speed of the engine. Thus, a range of possible rotational speeds of the rotating electric machine increases. Here, when the rotational speed of the rotating electric machine is high, an induced voltage that can be generated by the rotating electric machine also increases.

Therefore, when the rotational speed of the rotating electric machine is high, a large amount of generated electric power can be obtained as a result of the rotating electric machine generating electric power without the generated voltage thereof being suppressed. In particular, when the rotating electric machine generates electric power using kinetic energy of the vehicle during deceleration of the vehicle, regenerative energy during deceleration can be effectively recovered as a result of the generated voltage of the rotating electric machine being set to be high.

The generated electric power of the rotating electric machine is stored in a main electric-power storage apparatus that is mounted to the vehicle. The main electric-power storage apparatus serves as an electric power supply source for onboard electrical components. A nominal voltage of the main electric-power storage apparatus is generally set to 12 V, taking into consideration rated voltages of the electrical components. Here, a voltage that is supplied to the main electric-power storage apparatus when the main electric-power storage apparatus is charged with the generated electric power of the rotating electric machine is required to be equal to or lower than a rated voltage of the main electric-power storage apparatus.

Therefore, JP-A-2008-172851 discloses a technology in which a voltage converter is provided between the rotating electric machine and the main electric-power storage apparatus. The voltage converter steps down the generated voltage of the rotating electric machine and supplies the stepped-down voltage to the main electric-power storage apparatus.

In the configuration described in JP-A-2008-172851 that includes the voltage converter, the voltage that is supplied to the main electric-power storage apparatus when the main electric-power storage apparatus is charged with the generated electric power of the rotating electric machine can be set to be equal to or lower than the rated voltage of the main electric-power storage apparatus. As a result, the main electric-power storage apparatus can be appropriately charged with the generated electric power of the rotating electric machine. Insufficiency in the electric power supplied from the main electric-power storage apparatus to the electrical components can be prevented.

The voltage converter is generally configured as a switching regulator that includes an inductor, a capacitor, a switching device, a control circuit that controls the switching device, and a cooling apparatus. Here, the inductor, the capacitor, and the cooling apparatus are physically large and high in cost. Consequently, the voltage converter tends to become physically large and high in cost.

SUMMARY

It is thus desired to provide an onboard charging apparatus that is capable of storing generated electric power of a rotating electric machine in a main electric-power storage apparatus using a simple configuration in which a voltage converter is not used, and stably supplying electric power from the main electric-power storage apparatus to an electrical component.

Means for solving the above-described issues and working effects thereof will be described below.

A first exemplary embodiment provides an onboard charging apparatus that includes: a rotating electric machine that generates electric power by being rotated by motive power supplied from an engine that is mounted to a vehicle or kinetic energy of the vehicle that is traveling; and a plurality of main electric-power storage apparatuses that are capable of storing generated electric power outputted from an output terminal of the rotating electric machine.

In the first exemplary embodiment, the plurality of main electric-power storage apparatuses are connected in series to one another. A main electric-power storage apparatus on a lowest potential side of the plurality of main electric-power storage apparatuses is a lowest potential electric-power storage apparatus. The lowest potential electric-power storage apparatus has a nominal voltage that is set to 12 V, and supplies electric power to an electrical component mounted to the vehicle.

The first exemplary embodiment includes: a connecting unit that selectively connects, by switching control, the output terminal and any of high potential side terminals of the plurality of main electric-power storage apparatuses; and a switching control unit that controls switching of the connecting unit to switch the high potential side terminal selected as a connection destination of the output terminal among the high potential side terminals of the plurality of main electric-power storage apparatuses, based on an output voltage of the output terminal.

The first exemplary embodiment includes the plurality of main electric-power storage apparatuses that are connected in series to one another. Among the plurality of main electric-power storage apparatuses, the lowest potential electric-power storage apparatus has a nominal voltage that is set to 12 V. In addition, the lowest potential electric-power storage apparatus supplies electric power to an onboard electrical component. Furthermore, the first exemplary embodiment includes the connecting unit that selectively connects, by switching control, the output terminal of the rotating electric machine and any of the high potential side terminals of the plurality of main electric-power storage apparatuses.

In addition, the first exemplary embodiment includes the switching control unit. The switching control unit controls switching of the connecting unit to switch the high potential side terminal selected as the connection destination of the output terminal among the high potential side terminals of the plurality of main electric-power storage apparatuses, based on the output voltage of the output terminal of the rotating electric machine that is generating electric power.

As a result of the first exemplary embodiment, the high potential side terminal based on the output voltage of the output terminal is selected as the connection destination of the output terminal. Consequently, even should the output voltage of the output terminal exceed the rated voltage of the lowest potential electric-storage apparatus, a main electric-power storage apparatus including at least the lowest potential electric-power storage apparatus among the plurality of main electric-power storage apparatuses can be charged with the generated electric power of the rotating electric motor, without use of a voltage converter. Therefore, electric power can be stably supplied from the main electric-power storage apparatus to the electrical component.

A second exemplary embodiment includes an auxiliary electric-power storage apparatus that is connected to the output terminal and includes a battery capacity and an internal resistance that are smaller than those of the main electric-power storage apparatus.

When the switching control of the connecting unit is performed during power generation of the rotating electric machine, the connection between the high potential side terminal of the main electric-power storage apparatus and the output terminal of the rotating electric machine is temporarily broken. In this case, the voltage of an electrical path connecting the output terminal and the connecting unit temporarily excessively increases, and the reliability of the rotating electric machine and the like may decrease.

Therefore, the second exemplary embodiment includes the auxiliary electric-power storage apparatus that is connected to the output terminal. As a result, even when the connection between the high potential side terminal of the main electric-power storage apparatus and the output terminal of the rotating electric machine is temporarily broken during power generation of the rotating electric machine, the increase in the voltage of the electrical path can be absorbed by the auxiliary electric-power storage apparatus. Consequently, the voltage of the electrical path can be prevented from becoming excessively high. Reduced reliability of the rotating electric machine and the like can be prevented.

Furthermore, in the second exemplary embodiment, the battery capacity of the auxiliary electric-power storage apparatus is smaller than the battery capacity of the main electric-power storage apparatus. A reason for this is that the voltage increase occurring during the switching control of the connecting unit is a temporary phenomenon. A large battery capacity is not required to absorb the voltage increase. In addition, in the second exemplary embodiment, the internal resistance of the auxiliary electric-power storage apparatus is smaller than the internal resistance of the main electric-power storage apparatus. A reason for this is to quickly absorb the voltage increase occurring over a short amount of time.

Here, specifically, a rotating electric machine that is connected to an output shaft of the engine, and configured such that the output voltage of the output terminal increases as a rotational speed of the output shaft increases, as in a third exemplary embodiment, can be used as the rotating electric machine. In this case, the switching control unit selects, as the connection destination of the output terminal, a high potential side terminal of a main electric-power storage apparatus on a higher potential side among the main electric-power storage apparatuses as the rotational speed of the output shaft increases.

In addition, specifically, a rotating electric machine that is connected further towards a drive wheel side than to a transmission on a motive-power transmission path that connects the drive wheels and the output shaft of the engine, and configured such that the output voltage of the output terminal increases as a traveling speed of the vehicle increases, as in a fourth exemplary embodiment, can be used as the rotating electric machine. In this case, the switching control unit selects, as the connection destination of the output terminal, a high potential side terminal of a main electric-power storage apparatus on the higher potential side among the main electric-power storage apparatuses as the traveling speed of the vehicle increases.

For example, regenerative power generation in which the rotating electric machine generates electric power by being rotated by kinetic energy of the vehicle is performed. In this case, as a result of the third and fourth exemplary embodiments, the main electric-power storage apparatus suitable for the output voltage of the output terminal that decreases based on the decrease in the engine rotational speed or the traveling speed of the vehicle during the regenerative power generation can be selected as a subject to be charged.

In a fifth exemplary embodiment, the rotating electric machine includes: a field winding through which an excitation current that adjusts the generated electric power flows; and a field switch that supplies electric power to the field winding by being turned on and interrupts the supply of electric power to the field winding by being turned off. The fifth exemplary embodiment includes: a regeneration determining unit that determines whether or not regenerative power generation is being performed in which the rotating electric machine generates electric power by being rotated by kinetic energy of the vehicle; and a field control unit that keeps the field switch turned on during a period in which the regeneration determining unit determines that the regenerative power generation is being performed.

The generated electric power of the rotating electric machine can be adjusted by the excitation current flowing to the field winding. Specifically, the generated electric power of the rotating electric machine increases as the excitation current increases. Here, in the fifth exemplary embodiment, the field switch remains turned on during the period in which the regeneration determining unit determines that the regenerative power generation is being performed. Therefore, the excitation current during the period in which the regenerative power generation is being performed can be made large and electric power generated by the regenerative power generation can be increased.

In a sixth exemplary embodiment, the rotating electric machine is configured such that a part of an output current of the rotating electric machine generated by power generation flows to the field winding as the excitation current.

As a result of the sixth exemplary embodiment, the rotating electric machine itself can supply the excitation current sent to the field winding. Therefore, electric power necessary for sending the excitation current to the field winding is not required to be supplied from the lowest potential electric-power storage apparatus. Consequently, increase in the number of subjects to be supplied electric power from the lowest potential electric-power storage apparatus can be prevented. Management of the storage amount of the lowest potential electric-power storage apparatus can be facilitated.

A seventh exemplary embodiment includes an auxiliary electric-power storage apparatus (44) that is connected to the output terminal and includes a battery capacity and an internal resistance that are smaller than those of the main electric-power storage apparatus. The switching control unit selects, as the connection destination of the output terminal, a high potential side terminal of a main electric-power storage apparatus on a lower potential side than a high potential side terminal selected upon completion of the regenerative power generation, among the high potential side terminals of the plurality of main electric-power storage apparatuses, after completion of the regenerative power generation in which the rotating electric machine generates electric power by being rotated by kinetic energy of the vehicle.

In a manner similar to the above-described second exemplary embodiment, the seventh exemplary embodiment includes an auxiliary electric-power storage apparatus. In this configuration, the auxiliary electric-power storage apparatus is charged together with the main electric-power storage apparatus when the regenerative power generation is performed. Here, when the storage amount of the auxiliary electric-power storage apparatus is large after the completion of regenerative power generation, there is concern that the voltage increase that subsequently occurs during the switching control of the switching unit may not be sufficiently absorbed.

Therefore, in the seventh exemplary embodiment, the switching control of the control unit is performed such that a high potential side terminal of a main electric-power storage apparatus on a lower potential side than a high potential side terminal selected upon completion of the regenerative power generation, among the high potential side terminals of the plurality of main electric-power storage apparatuses, is connected to the output terminal of the rotating electric machine after the completion of regenerative power generation.

As a result, current can be sent to a main electric-power storage apparatus including at least the lowest potential electric-power storage apparatus, among the plurality of main electric-power storage apparatuses, from the auxiliary electric-power storage apparatus. Consequently, the storage amount of the auxiliary electric-power storage apparatus can be reduced. Therefore, the voltage increase occurring during the switching control of the connecting unit can be absorbed.

An eighth exemplary embodiment includes a discharge switch that electrically connects the output terminal and the connecting unit by being turned on and electrically disconnects the output terminal and the connecting unit by being turned off. When the connection destination of the output terminal is switched to a high potential side terminal further on the low potential side than to the high potential side terminal selected upon completion of the regenerative power generation, among the high potential side terminals of the plurality of main electric-power storage apparatuses, the switching control unit controls the discharge switch to gradually increase a ratio of an on-time of the discharge switch in relation to a prescribed amount of time, with the elapse of time from the switching timing.

The electric potential of the high potential side terminal of the auxiliary electric-power storage apparatus may become excessively large in relation to the electric potential of the high potential side terminal of the main electric-power storage apparatus. In this case, when the high potential side terminal of a main electric-power storage apparatus having an electric potential that is excessively lower than the electric potential of the high electric potential side terminal of the auxiliary electric-power storage apparatus is selected as the connection destination, overcurrent may flow from the auxiliary electric-power storage apparatus to the main electric-power storage apparatus.

Therefore, in the eighth exemplary embodiment, the discharge switch is controlled such that the ratio of the on-time in relation to the prescribed time gradually increases with the elapse of time from the switching timing. As a result, overcurrent can be prevented from flowing immediately after the switching timing of the connection destination of the output terminal.

In a ninth exemplary embodiment, the rotating electric machine functions as an electric motor and transmits drive torque to the drive wheels of the vehicle. The ninth exemplary embodiment includes a drive control unit that controls switching of the connecting unit so as to connect any of the high potential side terminals of the plurality of main electric-power storage apparatuses and the output terminal while the vehicle is traveling, and enables the rotating electric machine to function as an electric motor by supplying electric power to the rotating electric machine from the main electric-power storage apparatus via the output terminal.

As a result of the ninth exemplary embodiment, the rotating electric machine can cover a part of the drive force of the vehicle required while the vehicle is traveling, such as during acceleration or cruising. Therefore, the drive force of the vehicle to be generated by the engine can be reduced, and the amount of fuel consumption of the engine can be reduced.

In addition, as a result of the ninth exemplary embodiment, as a result of the rotating electric machine being driven as an electric motor, energy collected in a main electric-power storage apparatus other than the lowest potential electric-power storage apparatus, among the plurality of main electric-power storage apparatuses, can also be consumed together with the energy collected in the lowest potential electric-power storage apparatus. Therefore, for example, the generated electric power of the rotating electric machine when the next regenerative power generation is performed can also be sufficiently collected in the main electric-power storage apparatus other than the lowest potential electric-power storage apparatus, among the plurality of main electric-power storage apparatuses.

In a tenth exemplary embodiment, the rotating electric machine is a first rotating electric machine. The vehicle includes a second rotating electric machine that applies drive torque to the drive wheels, as a main onboard engine. The drive control unit selects a high potential side terminal of a main electric-power storage apparatus on a high potential side, among the main electric-power storage apparatuses other than the lowest potential electric-power storage apparatus among the plurality of main electric-power storage apparatuses, as the connection destination of the output terminal when a rotational speed of the second rotating electric machine is high. The drive control unit selects a high potential side terminal of a main electric-storage apparatus on a low potential side as a connection destination of the output terminal when the rotational speed of the second rotating electric machine is low.

The induced voltage generated by the second rotating electric machine increases and the drive torque transmitted from the rotating electric machine to the drive wheels decreases, as the rotational speed of the second rotating electric machine increases. Here, as a result of the tenth exemplary embodiment, the voltage supplied to the first rotating electric machine from the main electric-power storage apparatus when the rotational speed of the second rotating electric machine is high can be made higher than the voltage supplied to the first rotating electric machine from the main electric-power storage apparatus when the rotational speed of the second rotating electric machine is low.

Consequently, the drive torque transmitted from the first rotating electric machine to the drive wheels when the rotational speed of the second rotating electric machine is high can be made greater than the drive torque transmitted from the first rotating electric machine to the drive wheels when the rotational speed of the second rotating electric machine is low. Therefore, assistance with the drive torque of the drive wheels can be appropriately provided by the first rotating electric machine.

Specifically, a lead storage battery can be used as the lowest potential electric-power storage apparatus, as in an eleventh exemplary embodiment. In addition, capacitors can be used as the main electric-power storage apparatuses other than the lowest potential electric-storage apparatus, among the plurality of main electric-power storage apparatuses, as in a twelfth exemplary embodiment.

DESCRIPTION OF THE EMBODIMENTS

First Embodiment

A first embodiment of an onboard charging apparatus of the present disclosure will hereinafter be described with reference to the drawings. According to the first embodiment, the onboard charging apparatus is applied to a vehicle in which an engine is mounted as a running power source.

Figure 1:
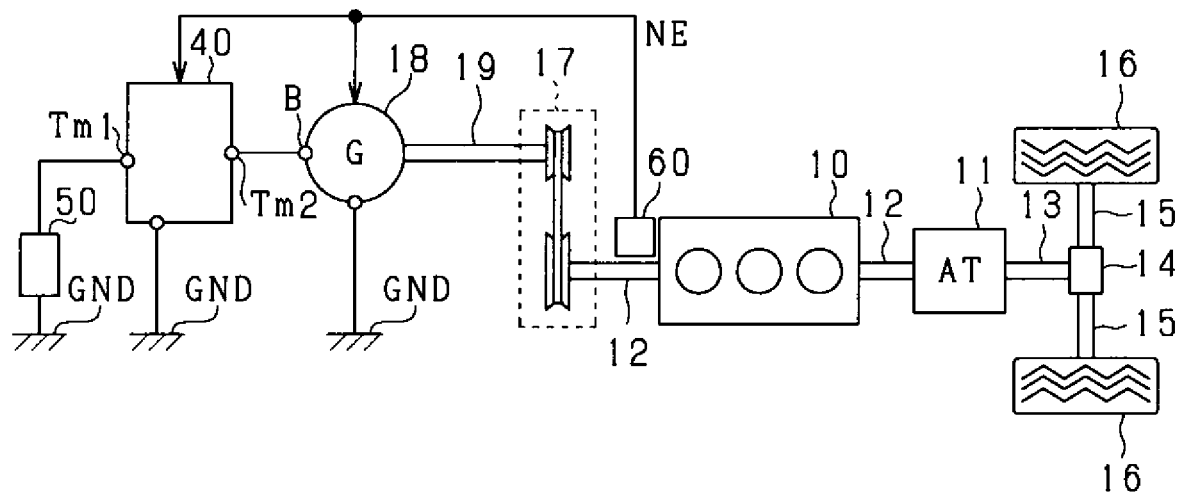
FIG. 1 is a diagram of an overall configuration of an onboard system according to a first embodiment.

As shown in FIG. 1, the vehicle includes an engine 10 and an automatic transmission 11. For example, the engine 10 is a multi-cylinder engine, and includes an injector (not shown) and the like. The automatic transmission 11 is connected to an output shaft 12 of the engine 10. The automatic transmission 11 is a continuously variable transmission or a multi-stage transmission. The automatic transmission 11 converts rotational force of the output shaft 12 to a rotational force based on a transmission gear ratio, and transmits the rotational force to a first axle 13. Drive wheels 16 are connected to the first axle 13 with a differential gear 14 and second axles 15 therebetween. The transmission is not limited to an automatic transmission and may be a manual transmission.

The vehicle includes a rotation transmission mechanism 17 and a rotating electric machine 18. The rotation transmission mechanism 17 is composed of a plurality of pulleys, belts, and the like. The rotation transmission mechanism 17 connects the output shaft 12 of the engine 10 and a rotation shaft 19. The rotation shaft 19 is provided in a rotor that configures the rotating electric machine 18. The rotor rotates by receiving rotational force from the side of the output shaft 12 of the engine 10. According to the present embodiment, the rotation transmission mechanism 17 is a speed increasing transmission mechanism that increases the rotational speed of the rotation shaft 19 relative to the rotational speed of the output shaft 12. For example, the speed increasing transmission mechanism is configured such that a speed-increase ratio ranges from 2.5 to 3.

The vehicle includes an electric-power storage module 40 and an electrical component 50. The electric-power storage module 40 is connected to an output terminal B of the rotating electric machine 18. In addition, the vehicle includes a rotational speed detecting unit 60 that detects the rotational speed of the output shaft 12 of the engine 10. According to the present embodiment, the electrical component 50 includes a plurality of electrical components. However, according to the present embodiment, the plurality of electrical components are collectively shown as the single electrical component 50 in the drawings.

The rotating electric machine 18 will be described with reference to FIG. 2.

The rotating electric machine 18 includes a three-phase stator winding 20, a rectifier 21, and a field winding 22. The stator winding 20 is wound around a stator core and configures a stator. According to the present embodiment, the stator winding 20 has a star connection. According to the present embodiment, the rotating electric machine 18 is a so-called integrated circuit (IC) regulator-type alternator.

The rectifier 21 converts an alternating-current voltage outputted from the stator winding 20 to a direct-current voltage. The rectifier 21 is a bridge circuit that has the same number of upper arms and the same number of lower arms as the number of phases of the stator winding 20 Specifically, the rectifier 21 is a three-phase full-wave rectifier that includes diodes. A first terminal T1 of the rectifier 21 is connected to the output terminal B of the rotating electric machine 18. A second terminal T2 of the rectifier 21 is connected to a ground GND of the vehicle. As a result of this configuration, an alternating-current current outputted from the stator winding 20 is converted to a direct-current current by the rectifier 21.

The field winding 22 configures a rotor. The field winding 22 is wound around a field pole (not shown) that is disposed in an opposing manner on an inner circumferential side of the stator core. The field pole is magnetized as a result of an excitation current flowing to the field winding 22. The alternating-current voltage is then outputted from the stator winding 20 as a result of a rotating magnetic field generated when the field pole is magnetized.

The field winding 22 is connected in parallel to a freewheeling diode 23. The first terminal T1 of the rectifier 21 is connected to a first end of the field winding 22. A second end of the field winding 22 is connected to the ground GND with a field switch 24 therebetween. According to the present embodiment, an N-channel metal-oxide-semiconductor field-effect transistor (MOSFET) is used as the field switch 24. As a result of this configuration, a part of the direct-current current outputted from the rectifier 21 can be sent to the field winding 22 as the excitation current.

The rotating electric machine 18 includes a field control unit 25. The field control unit 25 detects the generated voltage at the output terminal B, and controls on and off of the field switch 24 to perform feedback control to control the detected generated voltage to a target voltage Vtgt. As a result, the excitation current flowing to the field winding 22 is adjusted. The generated voltage is controlled to the target voltage Vtgt.

As a result of the configuration in which a part of the direct-current current outputted from the rectifier 21 is sent as the excitation current, the voltage applied to the field winding 22 increases in accompaniment with the increase in the generated voltage. The excitation current increases. As a result, the generated electric power can be increased.

Figure 3:
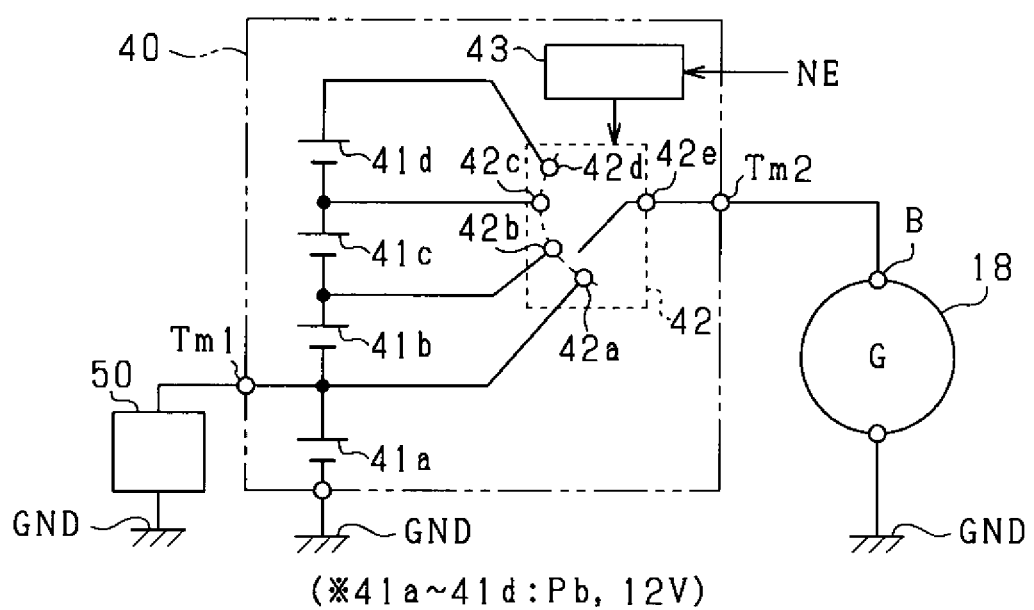
FIG. 3 is a diagram of an electric-power storage module.

Next, the electric-power storage module 40 will be described with reference to FIG. 3.

The electric-power storage module 40 includes first to fourth main electric-power storage apparatuses 41a to 41d, a connecting unit 42, a switching control unit 43, and a housing (not shown). The switching control unit 43 controls switching of the connecting unit 42. The first to fourth main electric-power storage apparatuses 41a to 41d, the connecting unit 42, and the switching control unit 43 are housed in the housing. According to the present embodiment, lead storage batteries are used as the first to fourth electric-power storage apparatuses 41a to 41d. In addition, according to the present embodiment, respective nominal voltages of the first to fourth electric-power storage apparatuses 41a to 41d are set to 12 V.

According to the present embodiment, the first main electric-power storage apparatus 41a corresponds to a lowest potential electric-power storage apparatus. In addition, according to the present embodiment, the fourth electric-power storage apparatus 41d is a highest potential electric-power storage apparatus that is the main electric-power storage apparatus on the highest potential side among the main electric-power storage apparatuses 41a to 41d.

The first to fourth electric-power storage apparatuses 41a to 41d are connected in series to one another. The ground GND is connected to a negative terminal of the first main electric-power storage apparatus 31. A first module terminal Tm1 of the electric-power storage module 40 is connected to a positive terminal of the first main electric-power storage apparatus 41a. A positive terminal side of the electrical component 50 is connected to the first module terminal Tm1. The ground GND is connected to a negative terminal side of the electrical component 50. Therefore, the first main electric-power storage apparatus 41a serves as the electric power supply source of the electrical component 50.

According to the present embodiment, during use of the vehicle, a current of several tens of amperes is supplied from the first main electric-power storage apparatus 41a to the electrical component 50 at all times. Therefore, even when the first main electric-power storage apparatus 41a is charged with the generated electric power of the rotating electric machine 18, a terminal voltage of the first main electric-power storage apparatus 41a does not excessively increase. An electric potential of a positive terminal of the fourth main electric-power storage apparatus 41d relative to an electric potential of the ground GND also does not excessively increase.

The nominal voltage of the first and second main electric-power storage apparatuses 41a and 41b that are connected in series is 24 V. The nominal voltage of the first to third main electric-power storage apparatuses 41a to 41c that are connected in series is 36 V. The nominal voltage of the first to fourth main electric-power storage apparatuses 41a to 41d that are connected in series is 48 V.

The connecting unit 42 includes first to fourth connection terminals 42a to 42d, and a reference terminal 42e. A connection point between the positive terminal of the first main electric-power storage apparatus 41a and a negative terminal of the second main electric-power storage apparatus 41b is connected to the first connection terminal 42a. For example, a solenoid relay or a non-shorting rotary switch can be used as the connecting unit 42.

A connection point between a positive terminal of the second main electric-power storage apparatus 41b and a negative terminal of the third main electric-power storage apparatus 41c is connected to the second connection terminal 42b. A connection point between a positive terminal of the third main electric-power storage apparatus 41c and a negative terminal of the fourth main electric-power storage apparatus 41d is connected to the third connection terminal 42c. The positive terminal of the fourth main electric-power storage apparatus 41d is connected to the fourth connection terminal 42d. The output terminal B of the rotating electric machine 18 is connected to the reference terminal 42e, with a second module terminal Tm2 of the electric-power storage module 40 therebetween.

The switching control unit 43 controls switching of the connecting unit 42 such that any one of the first to fourth connection terminals 42a to 42d is selectively connected to the reference terminal 42e. An engine rotational speed NE detected by the rotational speed detecting unit 60 is inputted to the switching control unit 43.

Figure 2:
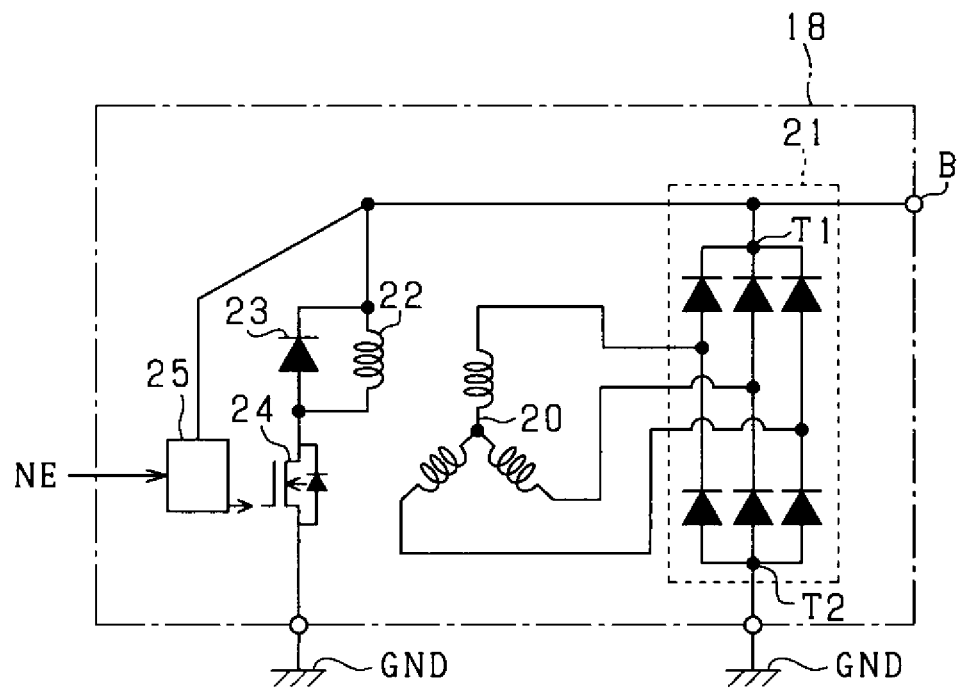
FIG. 2 is a diagram of a rotating electric machine.

As shown in FIG. 2, described above, in the configuration in which a part of the direct-current current outputted from the rectifier 21 is sent as the excitation current, electric power necessary for sending the excitation current to the field winding 22 is not required to be supplied from the first main electric-power storage apparatus 41a, via the connecting unit 42, the second module terminal Tm2, and the output terminal B. Therefore, increase in the number of subjects to be supplied electric power from the first main electric-power storage apparatus 41a can be prevented. Management of the storage amount of the first main electric-power storage apparatus 41a can be facilitated.

Figure 4:
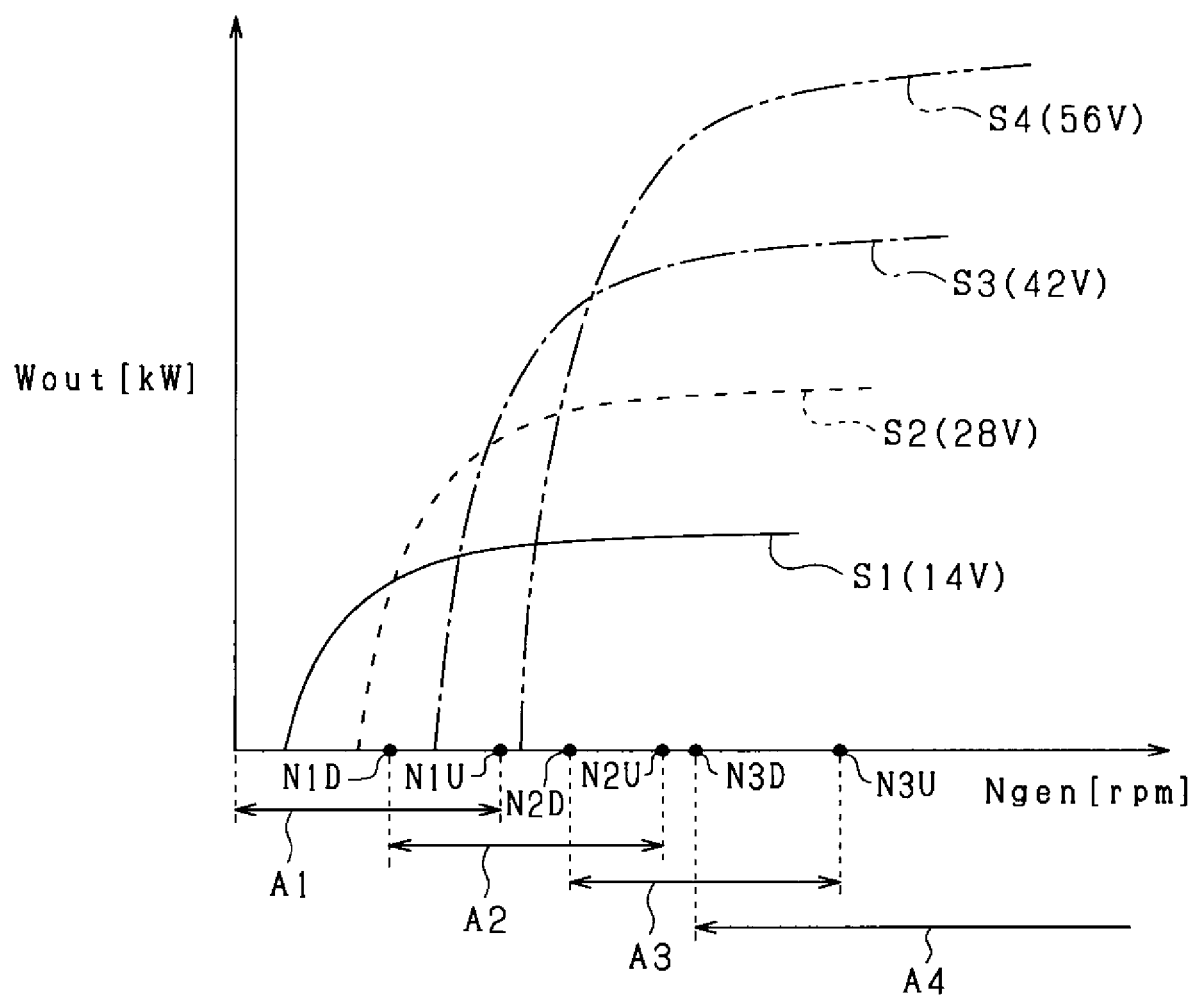
FIG. 4 is a diagram of power generation characteristics of the rotating electric machine.

FIG. 4 shows power generation characteristics in relation to a rotational speed Ngen of the rotor of the rotating electric machine 18. In FIG. 4, a first line S1, a second line S2, a third line S3, and a fourth line S4 respectively show the characteristics when the target voltage Vtgt is 14 V, 28 V, 42 V, and 56 V, respectively. As indicated as the lines S1 to S4, a maximum generated electric power Wout that can be outputted from the output terminal B increases as the rotational speed Ngen increases. In addition, the maximum generated electric power Wout increases and a minimum value of the rotational speed Ngen at which power generation can be started increases, as the generated voltage at the output terminal B increases.

The switching control unit 43 of the electric-power storage module 40 and the field control unit 25 of the rotating electric machine 18 perform various types of control in cooperation with each other, based on the engine rotational speed NE.

Figure 5:
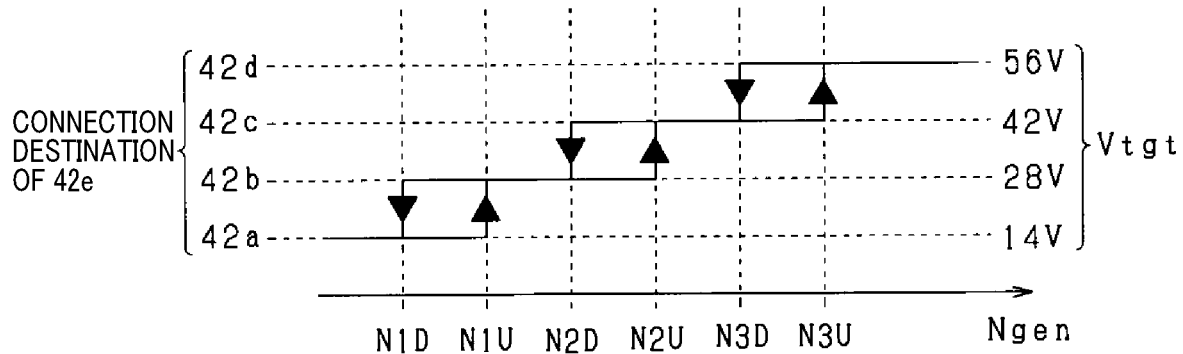
FIG. 5 is a diagram of a switching aspect of a connecting unit based on a rotational speed of the rotating electric machine.

Specifically, as shown in FIGS. 4 and 5, when the rotational speed Ngen is determined to be equal to or lower than a first increase threshold N1U (such as 1500 rpm), the field control unit 25 sets the target voltage Vtgt to 14 V.

When the rotational speed Ngen is determined to be equal to or lower than the first increase threshold N1U, the switching control unit 43 controls switching of the connecting unit 42 such that the first connection terminal 42a at which the voltage is lower than the target voltage Vtgt and the reference terminal 42c are connected. As a result, the first main electric-power storage apparatus 41a is charged with the generated electric power outputted from the output terminal B of the rotating electric machine 18.

According to the present embodiment, the first increase threshold N1U is set to a value that is higher than the rotational speed Ngen corresponding to an intersection between the first line S1 and the second line S2 and lower than the rotational speed Ngen corresponding to an intersection between the third line S3 and the fourth line S4.

The rotational speed Ngen may be calculated based on the engine rotational speed NE and the speed-increase ratio of the rotation transmission mechanism 17.

When the rotational speed Ngen is determined to be higher than the first increase threshold N1U and equal to or lower than a second increase threshold N2U (such as 2200 rpm), the field control unit 25 sets the target voltage Vtgt to 28 V.

When the rotational speed Ngen is determined to be higher than the first increase threshold N1U and equal to or lower than the second increase threshold N2U, the switching control unit 43 controls switching of the connecting unit 42 such that the second connection terminal 42b at which the voltage is lower than the target voltage Vtgt and the reference terminal 42e are connected. As a result, a series-connection body composed of the first and second main electric-power storage apparatuses 41a and 41b is charged with the generated electric power outputted from the output terminal B.

Here, according to the present embodiment, the second increase threshold N2U is set to a value that is higher than the rotational speed Ngen corresponding to an intersection between the second line S2 and the third line S3. More specifically, the second increase threshold N2U is set to a value that is higher than the rotational speed Ngen corresponding to an intersection between the third line S3 and the fourth line S4.

When the rotational speed Ngen is determined to be higher than the second increase threshold N2U and equal to or lower than a third increase threshold N3U (such as 3000 rpm), the field control unit 25 sets the target voltage Vtgt to 42 V.

When the rotational speed Ngen is determined to be higher than the second increase threshold N2U and equal to or lower than the third increase threshold N3U, the switching control unit 43 controls switching of the connecting unit 42 such that the third connection terminal 42c at which the voltage is lower than the target voltage Vtgt and the reference terminal 42e are connected. As a result, a series-connection body composed of the first to third main electric-power storage apparatuses 41a to 41c is charged with the generated electric power outputted from the output terminal B.

When the rotational speed Ngen is determined to be higher than the third increase threshold N3U (>N2U), the field control unit 25 sets the target voltage Vtgt to 56 V. When the rotational speed Ngen is determined to be higher than the third increase threshold N3U, the switching control unit 43 controls switching of the connecting unit 42 such that the fourth connection terminal 42d at which the voltage is lower than the target voltage Vtgt and the reference terminal 42e are connected. As a result, a series-connection body composed of the first to fourth main electric-power storage apparatuses 41a to 41d is charged with the generated electric power outputted from the output terminal B.

As described above, the rotating electric machine 18 is configured such that the generated voltage at the output terminal B increases in stages as the rotational speed Ngen increases. In addition, the switching control unit 43 controls switching of the connecting unit 42 so as to select the positive terminal at which the electric potential is the higher, among the positive terminals of the first to fourth main electric-power storage apparatuses 41a to 41d, as a connection destination of the output terminal B.

When the rotational speed Ngen is determined to have fallen below a third decrease threshold N3D (such as 2700 rpm) that is lower than the third increase threshold N3U and higher than the second increase threshold N2U, the field control unit 25 switches the target voltage Vtgt from 56 V to 42 V.

When the rotational speed Ngen is determined to have fallen below the third decrease threshold N3D, the switching control unit 43 switches a connection destination of the reference terminal 42e from the fourth connection terminal 42d to the third connection terminal 42c. Here, according to the present embodiment, the third decrease threshold N3D is set to a value that is higher than the rotational speed Ngen corresponding to the intersection between the third line S3 and the fourth line S4.

When the rotational speed Ngen is determined to have fallen below a second decrease threshold N2D (such as 1800 rpm) that is lower than the second increase threshold and higher than the first increase threshold N1U, the field control unit 25 switches the target voltage Vtgt from 42 V to 28 V.

When the rotational speed Ngen is determined to have fallen below the second decrease threshold N2D, the switching control unit 43 switches the connection destination of the reference terminal 42e from the third connection terminal 42c to the second connection terminal 42b. Here, according to the present embodiment, the second decrease threshold N2D is set to a value that is higher than the rotational speed Ngen corresponding to the intersection between the second line S2 and the third line S3.

When the rotational speed Ngen is determined to have fallen below a first decrease threshold N1D (such as 1000 rpm) that is lower than the first increase threshold N1U, the field control unit 25 switches the target voltage Vtgt from 28 V to 14 V.

When the rotational speed Ngen is determined to have fallen below the first decrease threshold N1D, the switching control unit 43 switches the connection destination of the reference terminal 42e from the second connection terminal 42b to the first connection terminal 42a. Here, according to the present embodiment, the first decrease threshold N1D is set to a value that is higher than the rotational speed Ngen corresponding to the intersection between the first line S1 and the second line S2.

As a result of the switching control in which the decrease thresholds N1D, N2D, and N3D are used, even should a variation amount of the engine rotational speed be large, frequent switching of the connection destination of the output terminal B can be prevented. As a result, variations in the generated voltage can be suppressed.

According to the present embodiment, the field control unit 25 performs regenerative power generation control. In the regenerative power generation control, the field control unit 25 performs control such that the rotating electric machine 18 generates electric power by being rotated by kinetic energy of the vehicle transmitted from the drive wheels 16 to the rotation shaft 19, via the automatic transmission 11, the output shaft 12, and the rotation transmission mechanism 17. In the regenerative power generation control, the field control unit 25 controls the field switch 24.

Figure 6:
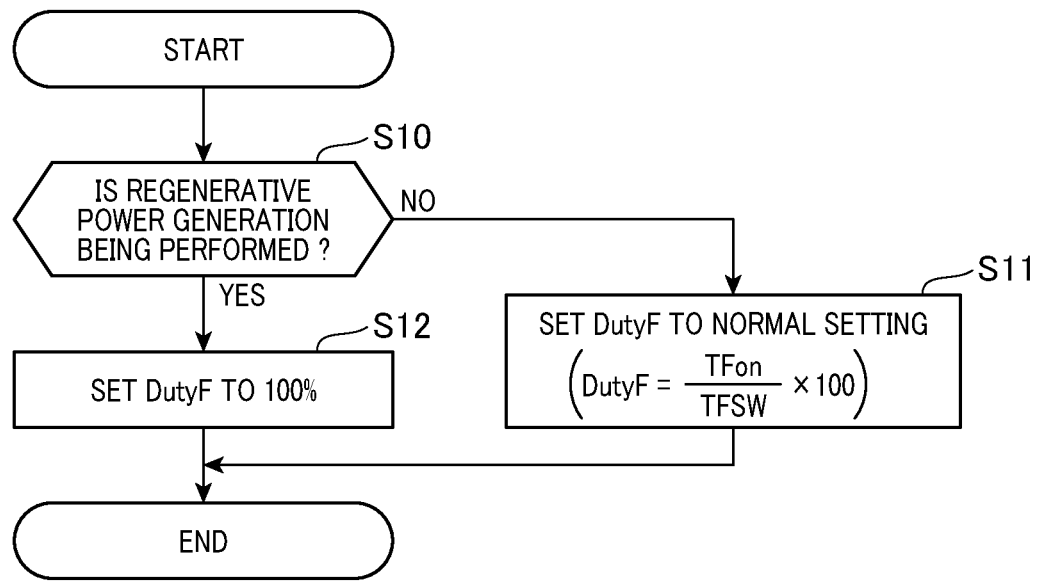
FIG. 6 is a flowchart of the steps in a process performed by a field control unit.

FIG. 6 shows the steps in a control process for the field switch 24 according to the present embodiment. The control process is repeatedly performed by the field control unit 25 at, for example, every predetermined cycle.

In this series of processes, first, at step S10, the field control unit 25 determines whether or not the regenerative power generation control is being performed. For example, the regenerative power generation control may be performed when an execution condition is determined to be met. The execution condition includes a condition that braking force is applied to the wheels by a brake operation by the driver and a condition that a traveling speed of the vehicle is equal to or higher than a predetermined speed. In addition, according to the present embodiment, the process at step S10 corresponds to a regeneration determining unit.

Figure 7:
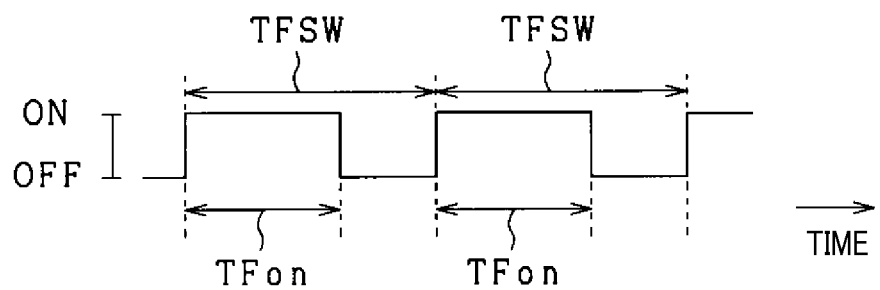
FIG. 7 is a time chart of a control aspect of a field switch.

When determined that the regenerative power generation control is not being performed at step S10, the field control unit 25 proceeds to step S11. At step S11, the field control unit 25 sets a time ratio DutyF of the field switch 24 to perform feedback control to control the detected generated voltage to the target voltage Vtgt. According to the present embodiment, as shown in FIG. 7, the time ratio DutyF is defined as a ratio of an on-time TFon of the field switch 24 in relation to a single switching cycle TFSW of the field switch 24.

Meanwhile, when determined that the regenerative power generation control is being performed at step S10, the field control unit 25 proceeds to step 512 and sets the time ratio DutyF to 100%. As a result, the field switch 24 remains turned on while the regenerative power generation control is being performed. Consequently, the generated electric power that is generated through the regenerative power generation control can be increased. The generated voltage may exceed the target voltage Vtgt while the process at step S12 is being performed.

For example, a state in which the regenerative power generation control is started in a state in which the rotational speed Ngen exceeds the third increase threshold N3U is supposed.

In this case, when the traveling speed of the vehicle gradually decreases during the period in which the regenerative power generation control is being performed, the connection destination of the reference electrode 42e is successively switched from the positive terminal on the high potential side to the positive terminal on the low potential side, among the positive terminals of the first to fourth main electric-power storage apparatuses 41a to 41d, based on the selection method for the connection destination of the reference electrode 42e shown in FIG. 5, described above.

According to the present embodiment that includes the connecting unit 42, the positive terminal of a main electric-power storage apparatus having a higher electric potential is selected as the connection destination of the output terminal B, as the generated voltage of the rotating electric machine 18 increases.

As a result, even should the generated voltage exceed the rated voltage of the first main electric-power storage apparatus 41a, the first main electric-power storage apparatus 41a can be charged with the generated electric power of the rotating electric machine 18 without use of a voltage converter, such as that described in above-described JP-A-2008-172851. Therefore, electric power can be stably supplied from the first main electric-power storage apparatus 41a to the electrical component 50.

In addition, according to the present embodiment, the lead storage battery is used as the first main electric-power storage apparatus 41a configuring the electric-power storage module 40. In this regard, a configuration in which the first main electric-power storage apparatus 41a is a lithium ion battery can also be considered. The lead storage battery exhibits better battery performance during a cold state than the lithium ion battery.

Therefore, in the configuration in which the first main electric-power storage apparatus 41a is the lithium ion battery, a lead storage battery is separately required to enable the rotating electric machine 18 to function as a starter. Thus, according to the present embodiment in which the lead storage battery is used as the first main electric-power storage apparatus 41a, a separate lead storage battery other than the lead storage batteries configuring the electric-power storage module 40 is not required to be provided. As a result, size reduction and cost reduction of the charging apparatus can be achieved.

According to the present embodiment, the switching control unit 43 may perform switching control such that the first connection terminal 42a and the reference terminal 42e are connected by the connecting unit 42, in cases other than when the regenerative power generation control is being performed. In addition, the field control unit 25 may perform charging control of the first main electric-power storage apparatus 41a with the target voltage Vtgt set to 14 V.

As a result, the rotating electric machine 18 can be prevented from generating electric power by motive power supplied from the engine 10 to charge a main electric-power storage apparatus other than the first main electric-power storage apparatus 41a, among the first to fourth main electric-power storage apparatuses 41a to 41d, in cases other than when the regenerative power generation control is being performed. Therefore, unnecessary fuel injection can be prevented. An effect of reducing fuel consumption of the engine 10 can be improved.

Second Embodiment

Figure 8:
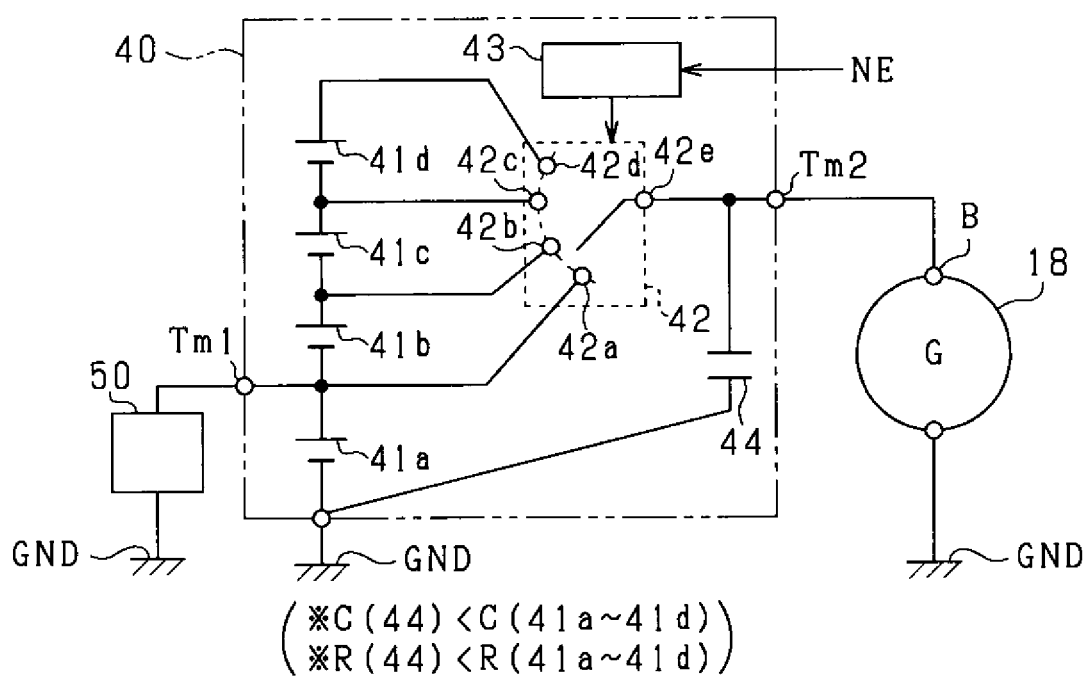
FIG. 8 is a diagram of an electric-power storage module according to a second embodiment.

A second embodiment will be described below according to the drawings, mainly focusing on the differences with the above-described first embodiment. As shown in FIG. 8, according to the present embodiment, the electric-power storage module 40 includes an auxiliary electric-power storage apparatus 44. According to the present embodiment, a capacitor is used as the auxiliary electric-power storage apparatus 44. Specifically, an electric double-layer capacitor is used. In FIG. 8, configurations that are identical to the configurations shown in FIG. 3, described above, are given the same reference numbers for convenience.

As shown in FIG. 8, a high potential side terminal of the auxiliary electric-power storage apparatus 44 is connected to an electrical path that connects the reference terminal 42e and the second module terminal Tm2. The ground GND is connected to a low potential side terminal of the auxiliary electric-power storage apparatus 44.

Next, the technological significance of providing the auxiliary electric-power storage apparatus 44 will be described.

When switching control of the connecting unit 42 is performed during power generation of the rotating electric machine 18, the connection between the positive terminal of any of the main electric-power storage apparatuses 41a to 41d and the reference terminal 42e is temporarily broken. The output current of the output terminal B is temporarily interrupted. In this case, the voltage across the electrical path connecting the reference terminal 42e and the output terminal B temporarily excessively increases, and reliability of the rotating electric machine 18 may decrease.

To solve such issues, temporarily stopping the flow of the excitation current to the field winding 22 during the switching control of the connecting unit 42 can be considered. However, when the flow of the excitation current is temporarily stopped, even should the excitation current resume flowing, a long amount of time, such as several hundred milliseconds, is required for excitation of the field winding 22 to end. In this case, power generation is interrupted each time the switching control of the connecting unit 42 is performed, and the power generation cannot be quickly started.

Therefore, according to the present embodiment, the auxiliary electric-power storage apparatus 44 is provided. As a result, even should the connection between the positive terminal of any of the first to fourth main electric-power storage apparatuses 41a to 41d and the reference terminal 42e be temporarily broken, the increase in the voltage of the electrical path connecting the reference terminal 42e and the output terminal B can be absorbed by the auxiliary electric-power storage apparatus 44. Therefore, the increase in the voltage of the electrical path can be prevented without the field winding 22 being excited again after the power generation is interrupted. Reduced reliability of the rotating electric machine 18 can be prevented.

In addition, according to the present embodiment, a battery capacity C of the auxiliary electric-power storage apparatus 44 is smaller than the respective battery capacities C of the first to fourth main electric-power storage apparatuses 41a to 41d. A reason for this is that the voltage increase occurring in the electrical path during the switching control of the connecting unit 42 is a temporary phenomenon and a large battery capacity is not necessary to absorb the voltage increase.

Furthermore, according to the present embodiment, an internal resistance R of the auxiliary electric-power storage apparatus 44 is smaller than the respective internal resistances R of the first to fourth main electric-power storage apparatuses 41a to 41d.

A reason for this is to enable the auxiliary electric-power storage apparatus 44 to quickly absorb the voltage increase occurring over a short amount of time in the electrical path connecting the reference terminal 42e and the output terminal B. The internal resistance R of the auxiliary electric-power storage apparatus 44 is smaller than the respective internal resistances R of the first to fourth main electric-power storage apparatuses 41a to 41d because the auxiliary electric-power storage apparatus 44 is a capacitor and the main electric-power storage apparatuses 41a to 41d are storage batteries.

Third Embodiment

Figure 9:
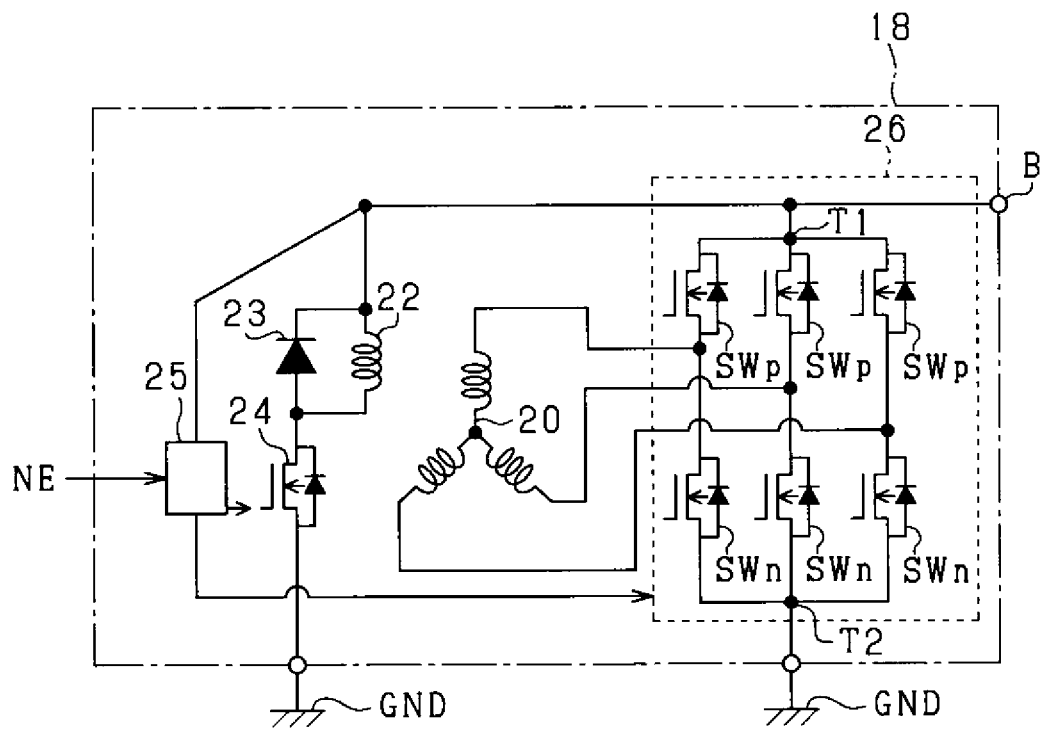
FIG. 9 is a diagram of a rotating electric machine according to a third embodiment.

A third embodiment will be described below according to the drawings, mainly focusing on the differences with the above-described second embodiment. As shown in FIG. 9, according to the present embodiment, the configuration of the rectifier is modified. In FIG. 9, configurations that are identical to the configurations shown in FIG. 2, described above, are given the same reference numbers for convenience.

As shown in FIG. 9, a rectifier 26 is an inverter that has upper arm switches SWp and lower arm switches SWn for the three phases. According to the present embodiment, N-channel MOSFETs are used for the switches SWp and SWn. In addition, body diodes are respectively connected in inverse parallel to the switches SWp and SWn.

The switches SWp and SWn are not limited to the N-channel MOSFETs and may be, for example, insulated-gate bipolar transistors (IGBTs). A material of the switches may be, for example, $S_1$, SiC, or GaN.

When the rotating electric machine 18 functions as a power generator, the field control unit 25 converts the alternating-current voltage outputted from the stator winding 20 to the direct-current voltage by performing synchronous rectification by controlling the switches SWp and SWn.

In addition, when the rotating electric machine 18 functions as an electric motor, the field control unit 25 converts the direct-current current supplied from the electric-power storage module 40 via the output terminal B to the alternating-current current by controlling the switches SWp and SWn, and supplies the alternating-current current to the stator winding 20. Control of the switches SWp and SWn can be performed through various types of control, such as rectangular-wave drive, sine-wave pulse width modulation (PWM) drive, or vector control.

Figure 10:
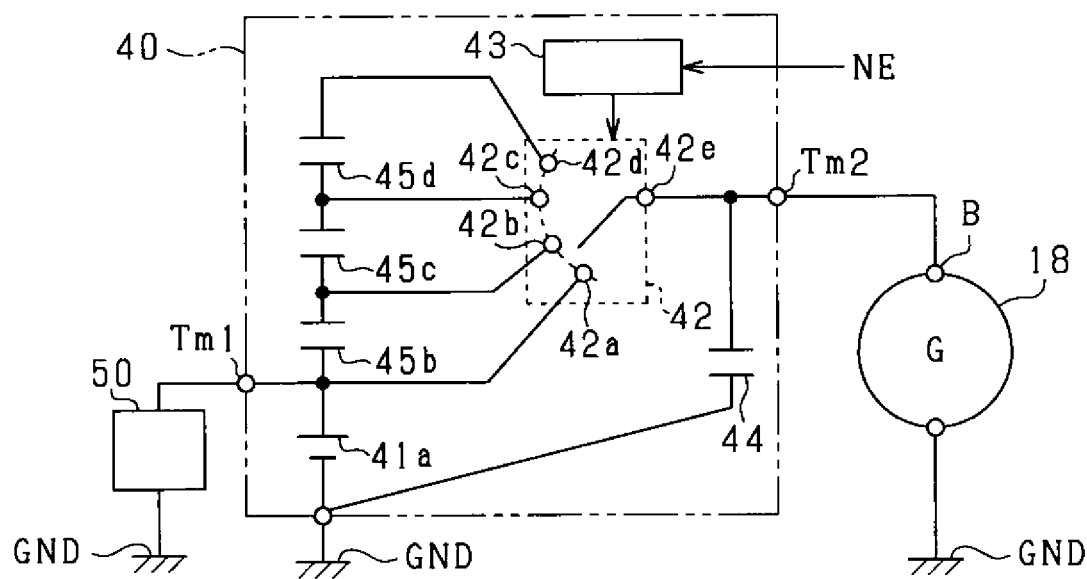
FIG. 10 is a diagram of an electric-power storage module.

Next, FIG. 10 shows the electric-power storage module 40 according to the present embodiment. In FIG. 10, configurations that are identical to the configurations shown in FIG. 8, described above, are given the same reference numbers for convenience.

As shown in FIG. 10, the electric-power storage module 40 includes second, third, and fourth main electric-power storage apparatuses 45b, 45c, and 45d that are capacitors, instead of the lead storage batteries. Specifically, electric double-layer capacitors can be used as the main electric-power storage apparatuses 45b, 45c, and 45d.

Unlike the lead storage battery that is a chemical battery, the capacitor has a wide voltage range that can be used during charging. Specifically, the voltage range of the capacitor is wider than that of the lead storage battery because a lower limit value of the voltage range is small. As a result, energy recovery efficiency in regenerative power generation can be increased.

According to the present embodiment, the internal resistances of the second, third, and fourth main electric-power storage apparatuses 45b, 45c, and 45d are smaller than the internal resistance of the first main electric-power storage apparatus 41a. In addition, according to the present embodiment, the battery capacities of the second, third, and fourth main electric-power storage apparatuses 45b, 45c, and 45d are larger than the battery capacity of the auxiliary electric-power storage apparatus 44.

Figure 11:
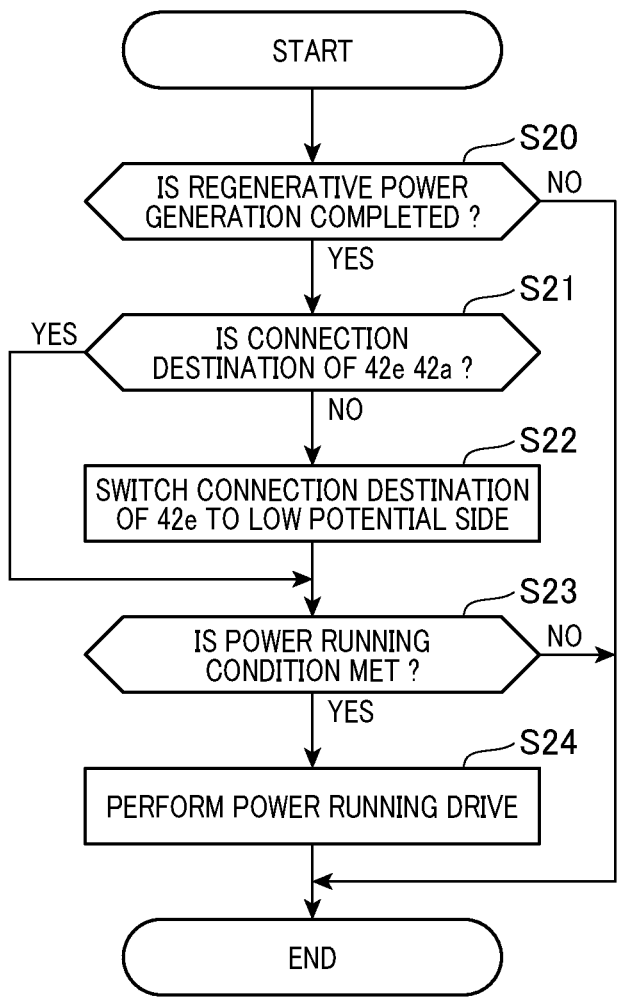
FIG. 11 is a flowchart of the steps in a process performed by a field control unit.

FIG. 11 shows the steps in a series of processes performed by the field control unit 25 according to the present embodiment. For example, the field control unit 25 performs this series of processes in response to a trigger, the trigger being the start of regenerative power generation control. The field control unit 25 that is the main executor of this series of processes exchanges information with the switching control unit 43 so as to work in cooperation with the switching control unit 43.

In the series of processes, first, at step S20, the field control unit 25 determines whether or not the regenerative power generation control is completed.

When determined that the regenerative power generation control is completed at step S20, the field control unit 25 proceeds to step S21. At step S21, the field control unit 25 determines whether or not the connection terminal that, among the first to fourth connection terminals 42*a* to 42*d*, is selected as the connection destination of the reference terminal 42*e* upon completion of the regenerative power generation is the first connection terminal 42*a*.

When determined NO at step S21, i.e., the connection terminal selected as the connection destination of the reference terminal 42*e* is not the first connection terminal 42*a*, the field control unit 25 proceeds to step S22. At step S22, the field control unit 25 outputs an instruction to the switching control unit 43 to switch the connection destination of the reference terminal 42*e* to a connection terminal that is further on the lower potential side. As a result, the reference terminal 42*e* and a connection terminal having a lower electric potential than the reference terminal 42*e* are connected.

Consequently, the current can be sent from the auxiliary electric-power storage apparatus 44 to the main electric-power storage apparatus, and the charging amount of the auxiliary electric-power storage apparatus 44 can be reduced. Therefore, the voltage increase occurring during the switching control of the connecting unit 42 can be further absorbed by the auxiliary electric-power storage apparatus 44.

When the terminal voltage of the auxiliary electric-power storage apparatus 44 decreases even after the elapse of a predetermined amount of time from switching of the connection destination of the reference terminal 42*e*, the connection destination of the reference terminal 42*e* can be successively switched to a connection terminal further on a lower potential side until the connection destination becomes the first connection terminal 42*e*.

Specifically, for example, when the terminal voltage of the auxiliary electric-power storage apparatus 44 decreases even after the elapse of the predetermined amount of time from when the connection destination of the reference terminal 42*e* is switched from the fourth connection terminal 42*d* to the third connection terminal 42*c*, the connection destination of the reference terminal 42*e* is switched to the second connection terminal 42*b*.

Then, when the terminal voltage of the auxiliary electric-power storage apparatus 44 decreases even after the elapse of the predetermined amount of time from when the connection destination of the reference terminal 42*e* is switched to the second connection terminal 42*b*, the connection destination of the reference terminal 42*e* is switched to the first connection terminal 42*a*. The terminal voltage of the auxiliary electric-power storage apparatus 44 can be detected by the voltage at the output terminal B.

In addition, when the terminal voltage of the auxiliary electric-power storage apparatus 44 decreases in a state in which the connection destination of the reference terminal 42*e* is the first connection terminal 42*a*, the storage amount of the first main electric-power storage apparatus 41*a* may be low. In this case, the field control unit 25 may perform charging control of the first main electric-power storage apparatus 41*a* to set the storage amount of the first main electric-power storage apparatus 41*a* to be equal to or greater than a prescribed amount.

When the process at step S22 is performed, the flow of excitation current to the field winding 22 may be stopped, and power generation by the rotating electric machine 18 may be stopped.

When the process at step S22 is completed or when determined YES at step S21, i.e., the connection terminal selected as the connection destination of the reference terminal 42*e* is the first connection terminal 42*a*, the field control unit 25 proceeds to step S23. At step S23, the field control unit 25 determines whether or not an execution condition for power running control of the rotating electric machine 18 is met.

Here, the power running control refers to control performed to assist with drive torque that is applied to the drive wheels 16, with the rotating electric machine 18 functioning as an electric motor and with the main electric-power storage apparatuses configuring the electric-power storage module 40 as the electric power supply source. In the power running control, the connection destination of the reference terminal 42*e* is any of the second to fourth connection terminals 42*b* to 42*d*. In addition, the switches SWp and SWn configuring the rectifier 26 are turned on and off.

For example, the execution condition for the power running control may be conditions including at least a condition that the vehicle is traveling. When determined that the execution condition is met at step S23, the field control unit 25 proceeds to step S24 and performs the power running control.

According to the present embodiment, the field control unit 25 and the switching control unit 43 correspond to a drive control unit.

According to the present embodiment described above, the rotating electric machine 18 can cover a part of the drive force of the vehicle required while the vehicle is traveling, such as during acceleration or cruising. Therefore, the effect of reducing fuel consumption of the engine 10 can be improved.

In addition, according to the present embodiment, the power running control is performed after the regenerative power generation control. Therefore, the energy collected in the second to fourth main electric-power storage apparatuses 45*b* to 45*d* can also be consumed together with the energy in the first main electric-power storage apparatus 41*a*.

As a result, the storage amounts of the second to fourth main electric-power storage apparatuses 45*b* to 45*d* can be made low in preparation for when the next regenerative power generation control is performed. Therefore, the generated electric power of the rotating electric machine 18 when the next regenerative power generation control is performed can be sufficiently collected in the second to fourth main electric-power storage apparatuses 45*b* to 45*d*, in addition to the first main electric-power storage apparatus 41*a*.

Fourth Embodiment

Figure 12:
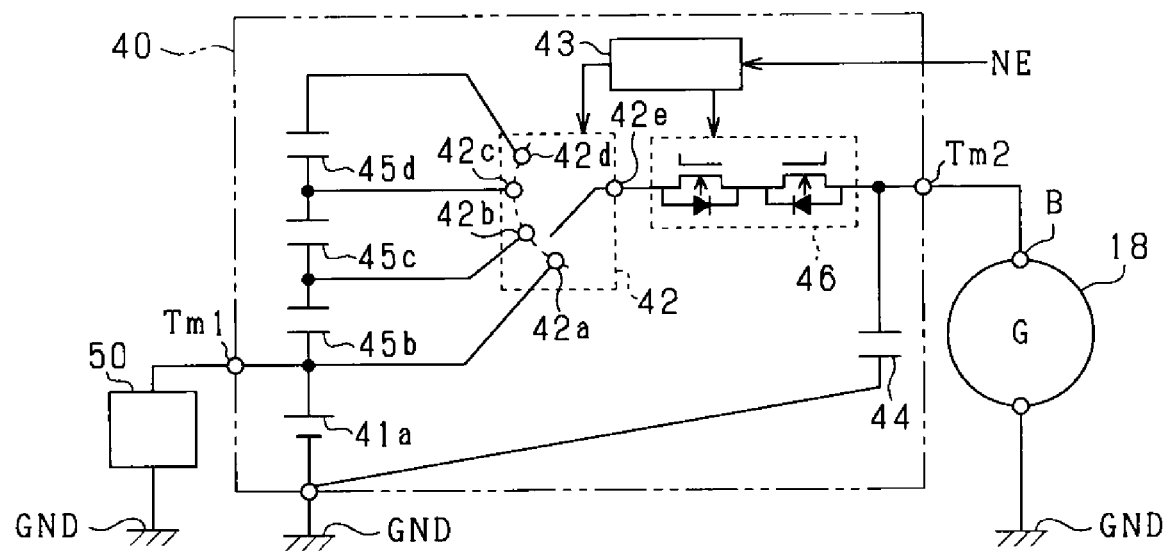
FIG. 12 is a diagram of an electric-power storage module according to a fourth embodiment.

A fourth embodiment will be described below according to the drawings, mainly focusing on the differences with the above-described third embodiment. As shown in FIG. 12, according to the present embodiment, the configuration of the electric-power storage module 40 is modified. In FIG. 12, configurations that are identical to the configurations shown in FIG. 10, described above, are given the same reference numbers for convenience.

As shown in FIG. 12, the electric-power storage module 40 includes a discharge switch 46. The discharge switch 46 is provided on an electrical path connecting the reference terminal 42e and the second module terminal Tm2, further towards the reference terminal 42e side than a connection point with the high potential side terminal of the auxiliary electric-power storage apparatus 44.

According to the present embodiment, the discharge switch 46 is configured by two N-channel MOSFETs. Respective drains of the two N-channel MOSFETs are connected to each other. This configuration serves to prevent a current from flowing through the body diodes of the N-channel MOSFETs during off-control of the discharge switch 46. The switching control unit 43 controls the discharge switch 46.

Figure 13:
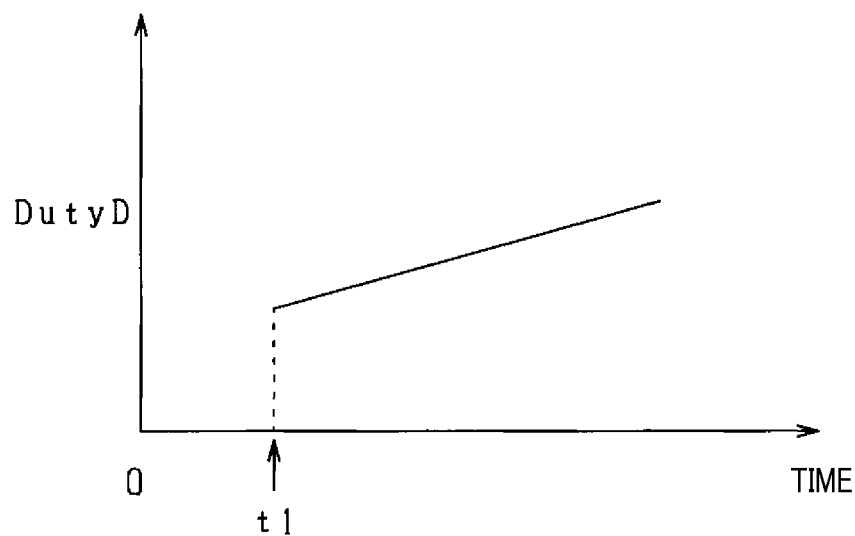
FIG. 13 is a time chart of a control aspect of a discharge switch.

According to the present embodiment, the process at step S22 in FIG. 11, described above, is modified. Specifically, as shown in FIG. 13, the field control unit 25 outputs an instruction to the switching control unit 43 to control the discharge switch 46 so as to gradually increase a time ratio DutyD (=TDon/TDSW×100%) with the elapse of time from a timing t1 at which the connection destination of the reference terminal 42e is switched to a connection terminal that is further on the low potential side, The time ratio DutyD is a ratio of an on-time TDon of the discharge switch 46 in relation to a single switching cycle TDSW of the discharge switch 46.

Even when the potential difference between the reference terminal 42e and the connection terminal is large, the current flowing from the output terminal B to the reference terminal 42e decreases as the time ratio DutyD decreases. As a result, even when the potential difference between the reference terminal 42e and the connection terminal is large, overcurrent can be prevented from flowing from the reference terminal 42e to the main electric-power storage apparatus in accompaniment with the switching of the connection destination of the reference terminal 42e. The time ratio DutyD may be set to 100% at a timing at which a threshold amount of time elapses from the timing at which the connection destination of the reference terminal 42e is switched to a connection terminal further on the low potential side.

Other Embodiments

The above-described embodiments may be carried out with the following modifications.

Figure 14:
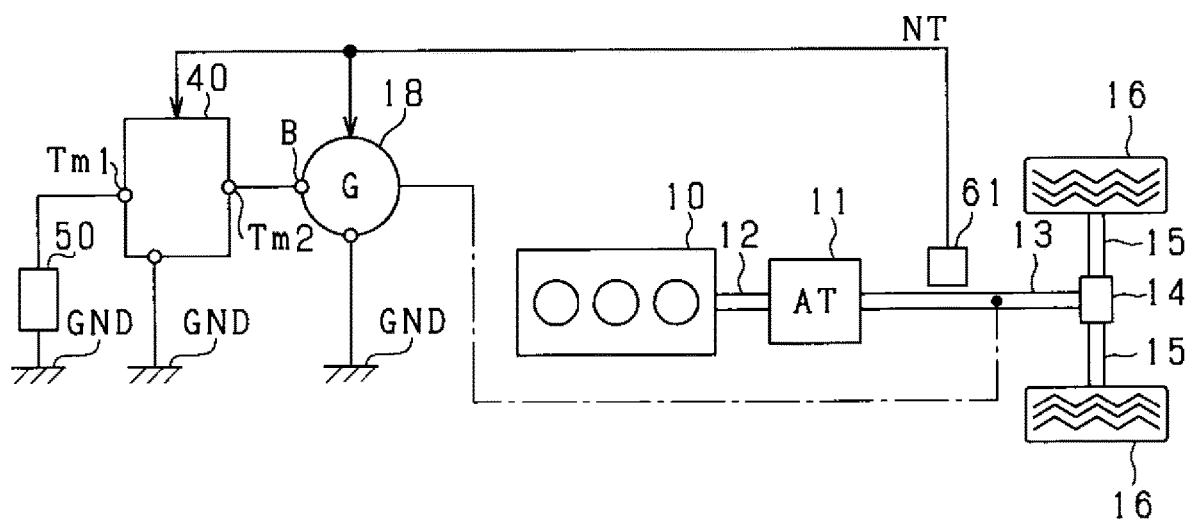
FIG. 14 is a diagram of an overall configuration of an onboard system according to another embodiment.

As shown in FIG. 14, a configuration is also possible in which the rotation shaft of the rotating electric machine 18 is connected on a motive-power transmission path from the drive wheels 16 to the output shaft 12 via the automatic transmission 11, further towards the drive wheel 16 side than the automatic transmission 11. In this case, the rotating electric machine 18 is configured such that the maximum generated electric power at the output terminal B increases as the rotational speed of the drive wheels 16 increases.

In this case, for example, the rotational speed Ngen of the rotor of the rotating electric machine 18 used to switch the connection destination of the reference terminal 42e may be calculated based on a detection value of a speed detecting unit 61 that detects the rotational speed of the first axle 13, the second axle 15, or the wheels. In FIG. 14, configurations that are identical to the configurations shown in FIG. 1, described above, are given the same reference numbers for convenience.

In addition, in the configuration shown in FIG. 14, the kinetic energy of the vehicle can be transmitted to the rotating electric machine 18 without passing through the automatic transmission 11. Therefore, motive power loss in the automatic transmission 11 can be removed from the motive power inputted to the rotating electric machine 18 to perform the regenerative power generation control. The kinetic energy of the vehicle can be more efficiently converted to electric energy by the rotating electric machine 18. As a result, the effect of reducing fuel consumption of the engine 10 can be further improved. In addition, in the configuration shown in FIG. 14, the engine 10 can be stopped, and the vehicle can be run by only the rotating electric machine 18, with the rotating electric machine 18 functioning as an electric motor.

The rotating electric machine 18 may be referred to as a first rotating electric machine 18. In this case, a second rotating electric machine that applies drive torque to the drive wheels 16 may be provided in the vehicle as a main onboard engine, together with the first rotating electric machine 18.

Here, for example, a permanent magnet field-type or a wound field-type synchronous motor may be used as the second rotating electric machine. In this case, at step S24 in FIG. 11, described above, the connection destination of the reference terminal 42e during power running control may be selected from the second to fourth connection terminals 42b to 42d based on a main-engine rotational speed Nm. The main-engine rotational speed Nm is the rotational speed of a rotor configuring the second rotating electric machine.

Figure 15:
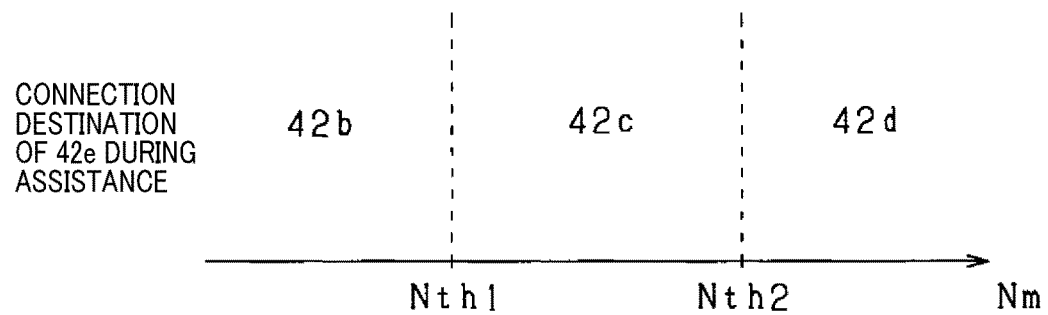
FIG. 15 is a diagram of a switching aspect of a connecting unit according to another embodiment.

Specifically, for example, as shown in FIG. 15, when the main-engine rotational speed Nm is determined to be equal to or lower than a first threshold Nth1, the field control unit 25 outputs an instruction to the switching control unit 43 to set the connection destination of the reference terminal 42e to the second connection terminal 42b.

Meanwhile, when the main-engine rotational speed Nm is determined to be higher than the first threshold Nth1 and equal to or lower than a second threshold Nth2 (>Nth1), the field control unit 25 outputs an instruction to the switching control unit 43 to set the connection destination of the reference terminal 42e to the third connection terminal 42c. Meanwhile, when the main-engine rotational speed Nm is determined to be higher than the second threshold Nth2, the field control unit 25 outputs an instruction to the switching control unit 43 to set the connection destination of the reference terminal 42e to the fourth connection terminal 42d.

As a result of this configuration, the voltage that is supplied to the stator winding 20 from the electric-power storage module 40 via the output terminal B can be increased as the main-engine rotational speed Nm increases. Therefore, the drive torque that is transmitted from the first rotating electric machine 18 to the drive wheels 16 can be increased as the main-engine rotational speed Nm increases. As a result, assistance with the drive torque of the drive wheels 16 can be appropriately provided by the first rotating electric machine 18.

According to the above-described embodiments, the storage battery is not limited to the lead storage battery. Other types of storage batteries may also be used. Here, even when the lithium ion battery is used as the main electric-power storage apparatus, effects similar to the effects achieved according to the above-described first embodiment can be achieved.

According to the above-described second to fourth embodiments, the auxiliary electric-power storage apparatus 44 may be a storage battery.

The second to fourth main electric-power storage apparatuses 45b to 45d in FIG. 12 according to the fourth embodiment may be lead storage batteries.

The number of main electric-power storage apparatuses is not limited to four, and may be two, three, five, or more. In this case, the number of connection terminals included in the connecting unit is the same as the number of main electric-power storage apparatuses.

According to the above-described embodiments, the field control unit 25 and the switching control unit 43 may be configured as a common control unit.

What is claimed is:

1. An onboard charging apparatus comprising:
   a rotating electric machine that generates electric power by being rotated by motive power supplied from an engine that is mounted to a vehicle or kinetic energy of the vehicle in a state of traveling;
   at least three main electric-power storage apparatuses that store generated electric power outputted from an output terminal of the rotating electric machine, the at least three main electric-power storage apparatuses being connected in series to one another, the at least three main electric-power storage apparatuses including:
      a lowest potential main electric-power storage apparatus on a lowest potential side of the at least three main electric-power storage apparatuses, the lowest potential main electric-power storage apparatus having a nominal voltage of 12 V, and supplying electric power to an electrical component mounted to the vehicle; and
   a connecting unit that selectively connects, by a switching control unit, the output terminal and a high potential side terminal of one of the at least three main electric-power storage apparatuses,
   wherein the switching control unit controls switching of the connecting unit to switch the high potential side terminal selected as a connection destination of the output terminal among high potential side terminals of the at least three main electric- power storage apparatuses, based on an output voltage of the output terminal, while a low potential side terminal of the lowest potential main electric-power storage apparatus is fixed at a potential of a ground terminal of the rotating electric machine,
   the rotating electric machine is connected to an output shaft of the engine, and configured such that the output voltage of the output terminal increases as a rotational speed of the output shaft increases, and
   the switching control unit selects, as the connection destination of the output terminal, the high potential side terminal of a higher potential side main electric-power storage apparatus of the at least three main electric-power storage apparatuses as the rotational speed of the output shaft increases.

2. The onboard charging apparatus according to claim 1, further comprising:
   an auxiliary electric-power storage apparatus that is connected to the output terminal and includes a battery capacity and an internal resistance that are smaller than those of the at least three main electric-power storage apparatuses.

3. The onboard charging apparatus according to claim 1, wherein:
   the vehicle includes drive wheels, and a transmission on a motive-power transmission path connecting the drive wheels and the output shaft of the engine;
   the rotating electric machine is connected further towards a drive wheel side than to the transmission on the motive-power transmission path, and configured such that the output voltage of the output terminal increases as a traveling speed of the vehicle increases, and
   the switching control unit selects, as the connection destination of the output terminal, the high potential side terminal of the higher potential side main electric-power storage apparatus as the traveling speed of the vehicle increases.

4. The onboard charging apparatus according to claim 1, wherein:
   the rotating electric machine comprises:
      a field winding through which an excitation current that adjusts the generated electric power flows; and
      a field switch that supplies electric power to the field winding by being turned on and interrupts the supply of electric power to the field winding by being turned off; and
   the onboard charging apparatus further comprises:
      a regeneration determining unit that determines whether or not regenerative power generation is being performed in which the rotating electric machine generates electric power by being rotated by kinetic energy of the vehicle; and
      a field control unit that keeps the field switch turned on during a period in which the regeneration determining unit determines that regenerative power generation is being performed.

5. The onboard charging apparatus according to claim 4, wherein:
   the rotating electric machine is configured such that a part of an output current of the rotating electric machine generated by power generation flows to the field winding as the excitation current.

6. The onboard charging apparatus according to claim 4, further comprising:
   an auxiliary electric-power storage apparatus that is connected to the output terminal and includes a battery capacity and an internal resistance that are smaller than those of the at least three main electric-power storage apparatuses, wherein
   the switching control unit selects, as the connection destination of the output terminal, the high potential side terminal of a lower potential side main electric-power storage apparatus of the at least three main electric-power storage apparatuses, after completion of the regenerative power generation in which the rotating electric machine generates electric power by being rotated by kinetic energy of the vehicle.

7. The onboard charging apparatus according to claim 6, further comprising:
   a discharge switch that electrically connects the output terminal and the connecting unit by being turned on and electrically disconnects the output terminal and the connecting unit by being turned off, wherein
   the switching control unit controls, when the connection destination of the output terminal is switched to the high potential side terminal of the lower potential side main electric-power storage apparatus, the discharge switch to gradually increase a ratio of an on-time of the discharge switch in relation to a prescribed amount of time, with elapse of time from a timing of the switching.

8. The onboard charging apparatus according to claim 1, wherein:
   the rotating electric machine functions as an electric motor and transmits drive torque to drive wheels of the vehicle; and
   the onboard charging apparatus further comprises:

a drive control unit that controls switching of the connecting unit so as to connect the high potential side terminal of one of the at least three main electric-power storage apparatuses and the output terminal while the vehicle is traveling, and enables the rotating electric machine to function as the electric motor by supplying electric power to the rotating electric machine from the one main electric-power storage apparatus via the output terminal.

9. The onboard charging apparatus according to claim 8, wherein:
the rotating electric machine is a first rotating electric machine;
the vehicle comprises a second rotating electric machine that applies drive torque to the drive wheels, as a main onboard engine; and
the drive control unit sets the high potential side terminal of one of the at least three main electric-power storage apparatuses as the connection destination of the output terminal based on a rotational speed of the second rotating electric machine.

10. The onboard charging apparatus according to claim 1, wherein:
the lowest potential main electric-power storage apparatus is a lead storage battery.

11. The onboard charging apparatus according to claim 1, wherein:
at least one of the at least three main electric-power storage apparatuses, other than the lowest potential main electric-power storage apparatus, is a capacitor.

12. The onboard charging apparatus according to claim 2, wherein:
the rotating electric machine is connected to the output shaft of the engine, and configured such that the output voltage of the output terminal increases as the rotational speed of the output shaft increases; and
the switching control unit selects, as the connection destination of the output terminal, the high potential side terminal of the higher potential side main electric-power storage apparatus as the rotational speed of the output shaft increases.

13. The onboard charging apparatus according to claim 2, wherein:
the vehicle includes drive wheels, and a transmission on a motive-power transmission path connecting the drive wheels and the output shaft of the engine;
the rotating electric machine is connected further towards a drive wheel side than to the transmission on the motive-power transmission path, and configured such that the output voltage of the output terminal increases as a traveling speed of the vehicle increases, and
the switching control unit selects, as the connection destination of the output terminal, the high potential side terminal of the higher potential side main electric-power storage apparatus as the traveling speed of the vehicle increases.

14. The onboard charging apparatus according to claim 2, wherein:
the rotating electric machine comprises:

a field winding through which an excitation current that adjusts the generated electric power flows; and
a field switch that supplies electric power to the field winding by being turned on and interrupts the supply of electric power to the field winding by being turned off; and
the onboard charging apparatus further comprises:
a regeneration determining unit that determines whether or not regenerative power generation is being performed in which the rotating electric machine generates electric power by being rotated by kinetic energy of the vehicle; and
a field control unit that keeps the field switch turned on during a period in which the regeneration determining unit determines that regenerative power generation is being performed.

15. The onboard charging apparatus according to claim 5, further comprising:
an auxiliary electric-power storage apparatus that is connected to the output terminal and includes a battery capacity and an internal resistance that are smaller than those of the at least three main electric-power storage apparatuses, wherein
the switching control unit selects, as the connection destination of the output terminal, the high potential side terminal of a lower potential side main electric-power storage apparatus of the at least three main electric-power storage apparatuses, after completion of the regenerative power generation in which the rotating electric machine generates electric power by being rotated by kinetic energy of the vehicle.

16. The onboard charging apparatus according to claim 2, wherein:
the rotating electric machine functions as an electric motor and transmits drive torque to drive wheels of the vehicle; and
the onboard charging apparatus further comprises:
a drive control unit that controls switching of the connecting unit so as to connect the high potential side terminal of one of the at least three main electric-power storage apparatuses and the output terminal while the vehicle is traveling, and enables the rotating electric machine to function as the electric motor by supplying electric power to the rotating electric machine from the one main electric-power storage apparatus via the output terminal.

17. The onboard charging apparatus according to claim 2, wherein:
the lowest potential main electric-power storage apparatus is a lead storage battery.

18. The onboard charging apparatus according to claim 2, wherein:
at least one of the at least three main electric-power storage apparatuses, other than the lowest potential main electric-power storage apparatus, is a capacitor.

* * * * *